Dec. 29, 1925.
J. R. OISHEI
MOTOR FOR WINDSHIELD CLEANERS
Filed April 8, 1922
1,567,328
2 Sheets-Sheet 1
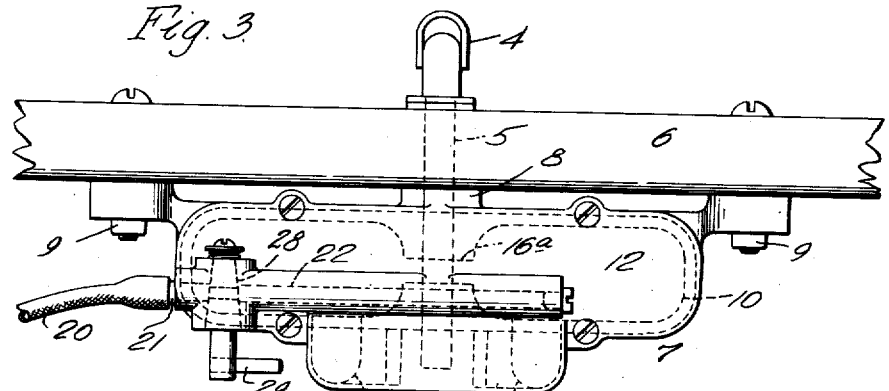
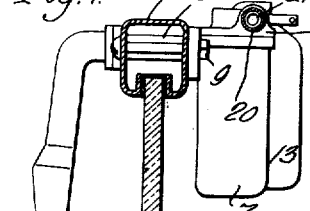
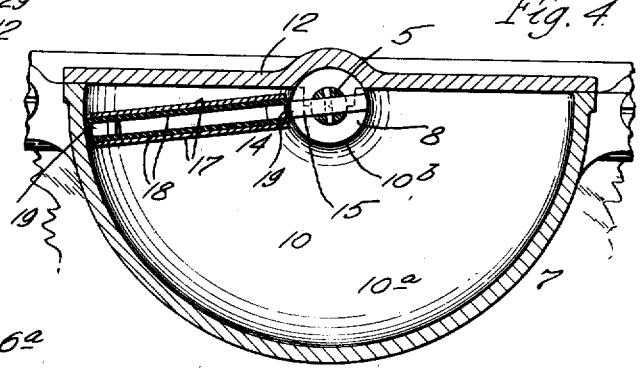
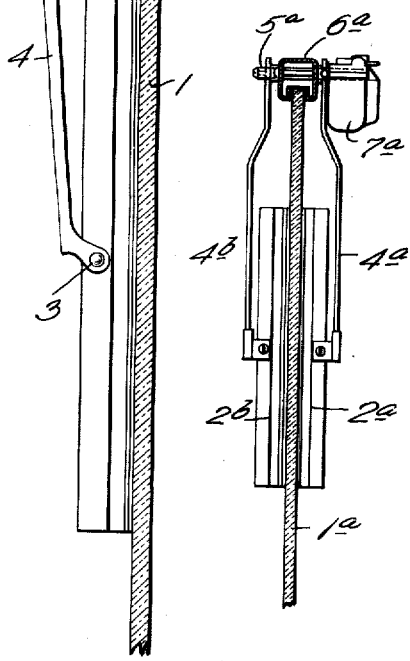
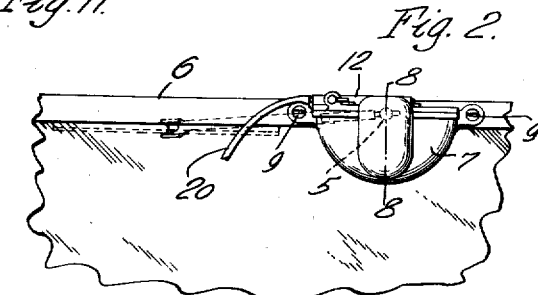
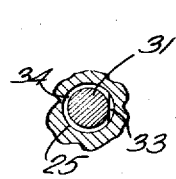
INVENTOR
John R. Oishei
by Parker & Rochrow.
ATTORNEYS.

Dec. 29, 1925.  1,567,328
J. R. OISHEI
MOTOR FOR WINDSHIELD CLEANERS
Filed April 8, 1922    2 Sheets—Sheet 2
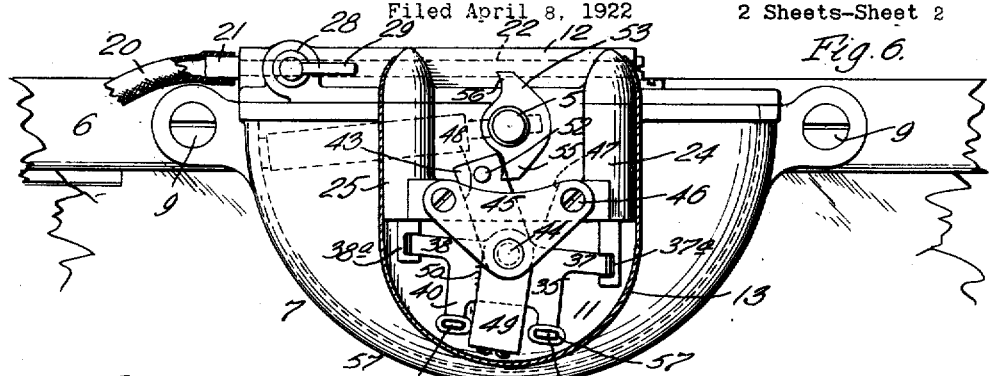
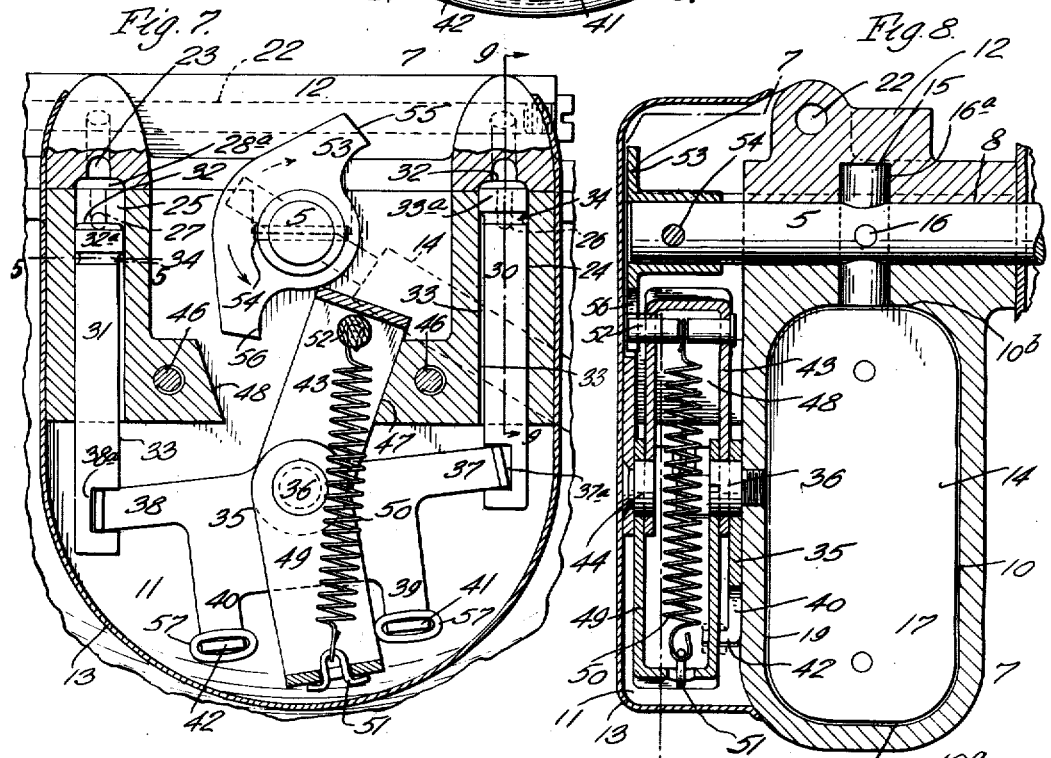
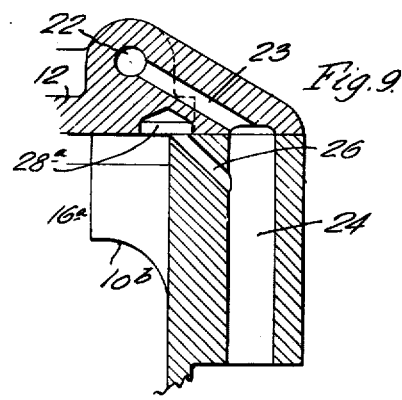
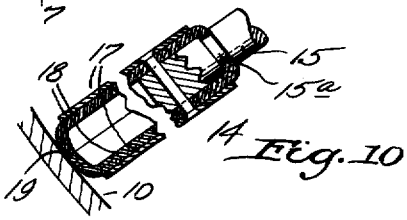
INVENTOR
John R. Oishei
by Parker & Rockwood
ATTORNEYS Patented Dec. 29, 1925.

1,567,328

UNITED STATES PATENT OFFICE.

JOHN R. OISHEI, OF BUFFALO, NEW YORK.

MOTOR FOR WINDSHIELD CLEANERS.

Application filed April 8, 1922. Serial No. 550,588.

*To all whom it may concern:*

Be it known that I, JOHN R. OISHEI, citizen of the United States, residing at Buffalo, in the county of Erie and State of New York, have invented a new and useful Improvement in Motors for Windshield Cleaners, of which the following is a specification.

This invention relates to motors of the type adapted to operate automatic or power actuated cleaners for automobile windshields and the like, in which the operating power is derived from a suitable source, such for instance as the pneumatic pressure derived by connecting the device with the intake manifold of an automobile engine. The motor, however, is not restricted to use on automobile windshields but is adapted for actuating devices for cleaning street car and other windows or shields and for other uses.

One of the objects of the invention is to produce a practical and desirable fluid pressure actuated motor which is strong and durable and which is not liable to get out of order. Other objects of the invention are to produce a motor in which the operating mechanism is compact and small, is not cumbersome or unsightly in appearance, which when used with a windshield cleaner, will not obstruct the driver's view through the windshield and can be readily applied to the windshield; also to produce a motor having the above characteristics in which there is obtained a maximum effective area of movement of the vane of the pneumatic motor and a simplified means for actuating the reversing valves of said motor. Another object is to produce a motor wherein an effective seal is maintained between the vane and the inner walls of the pressure chamber in all movements of the vane.

For the purpose of disclosing the invention, one embodiment thereof is illustrated in the accompanying drawings, in which:

Fig. 1 is a side elevation of a motor embodying the invention incorporated in a windshield cleaner in position on the windshield, a portion of which windshield being shown in section.

Fig. 2 is a rear elevation thereof on a reduced scale.

Fig. 3 is a plan view thereof on an enlarged scale.

Fig. 4 is a vertical sectional view of the vane chamber.

Fig. 5 is an enlarged horizontal section through one of the valve chambers on the line 5—5 of Fig. 7.

Fig. 6 is a rear elevation of the motor with the valve chamber cover broken away to show the valve operating mechanism.

Fig. 7 is a detail section on the line 7—7 of Fig. 8.

Fig. 8 is an enlarged sectional view of the motor on the line 8—8 of Fig. 2.

Fig. 9 is an enlarged detail section of the valve ports on the line 9—9 of Fig. 7.

Fig. 10 is an enlarged fragmentary sectional view of the vane.

Fig. 11 is a side elevation thereof on a reduced scale, showing the cleaner provided with two windshield wipers.

For the purpose of illustrating the invention, the motor is shown as incorporated in a windshield cleaner.

In the embodiment of the invention illustrated, the windshield 1, which is of ordinary construction and may be an automobile windshield or other window glass, is adapted to be cleaned by a wiper 2 arranged to be moved over the surface of the glass. This wiper may be of any usual or suitable construction and preferably consists of one or more strips of rubber or other material adapted to bear against and clean the face of the glass, and a metal channel piece in which the rubber strips are confined. The wiper is preferably loosely pivoted between its ends at 3 on a carrying arm 4 which extends at one side of the windshield from a rock shaft 5 which is suitably mounted to rock so as to oscillate the carrying arm and wiper 2 in an arc of a circle. The wiper can be pressed into wiping contact with the face of the shield by any suitable means, as for instance by making the carrying arm 4 resilient and adapted to press the wiper toward the shield, or by other suitable means.

In the construction shown the shaft 5 of the cleaner may extend through a hole in the top frame bar 6 of the shield 1 into a motor casing 7 and is journaled in a bearing 8 in the latter. The casing may be suitably mounted on the shield at its inner side, for example, by bolts or screws 9 passing through the frame bar 6 of the windshield. The casing 7 supports and encloses the operating parts of the motor for actuating the wiper.

The motor casing 7 is preferably provided with a pressure chamber 10 and a valve housing or chamber 11 located in rear of the pressure chamber, and comprises a main body portion and a removable top portion 12 bolted or otherwise secured on the body portion to close the ends of the pressure chamber. The casing is preferably divided on a plane immediately above the top of the shaft 5 and on the axial plane of the shaft at that portion of the casing embracing the shaft, to facilitate the assembling of the parts therein. A removable rear or cover member 13 forms the valve chamber 11.

The pressure chamber is preferably of segmental, circular shape in a plane parallel with the windshield glass 1, the inner and outer peripheral walls 10ª and 10ᵇ thereof being parallel and concentric, and the corners of the peripheral walls of the chamber are rounded transversely in a plane perpendicular to the windshield glass, the chamber in cross section being oblong in form with rounded corners, as shown in Fig. 8. The axis of the rock shaft 5 is concentric with the parallel segmental walls of the pressure chamber and carries a vane 14 which is located, and adapted to oscillate, in the pressure chamber. The vane at its upper end is provided midway of its two side edges with a shank 15 which passes through an opening in the rock shaft and is secured in position by a locking pin 16, and a suitable slot 16ª is formed in the upper wall of the chamber to permit the shank to oscillate with the vane. This vane 14 corresponds in shape with the cross sectional shape of the chamber and is oscillated in the chamber by means of pneumatic pressure applied alternately to the faces of the vane, and is preferably composed of pairs of duplicate connected plates or portions 17.

Improved means are provided for packing the vane so that an effective seal is maintained at all times between the vane and the chamber walls. These means preferably comprise cup shaped packing disks 18 secured between the plates 17 and having inwardly bent edges 19. The shape of the vane and its chamber lends itself readily to the proper packing since it enables the use of the cup shaped leather packing disks 18 which fold over the edges of the vane at all points and there are no angles which are hard to pack or apt to leak. As best shown in Figs. 4 and 10, the folded over edges of one disk engage the folded over edges of the other disk, the edges of the respective disks thereby supporting one another, preventing the edges being bent inwardly too far and breaking the seal between the vane and the sides of the chamber. The shank 15 is preferably provided with a peripheral groove 15ª into which the upper edges of the packing tightly fit, to prevent leaks through wear or any other cause at this point.

By the connecting of the vane with the rock shaft by means of the extending shank 15 and by making the inner and outer concentric segmental walls of the chamber parallel and mounting the rock shaft concentric with the inner wall, the full area of the vane is utilized as the effective area subjected to pneumatic pressure to oscillate it in either direction. Furthermore, the mounting of the vane and rock shaft in the manner shown and described permits a long stroke of the vane in its oscillating movement and permits it to move to a point almost parallel with the underside of the cover for the pressure chamber almost into engagement therewith.

Pneumatic pressure for operating the vane and wiper may be provided by the intake manifold of an automobile engine and to this end a flexible tube 20 is connected to the intake manifold of the automobile engine or other means for producing a suction or partial vacuum and is connected as by a nipple 21 with the motor casing 7. This nipple is connected by a suction passage 22 formed in the cover plate 12 and branch passages 23 with two valve chambers 24 and 25, each of which in turn is connected by duplicate ports 26 and 27 with the pressure chamber 10 at the opposite faces of the vane, there being one such port in each valve chamber. As shown in Fig. 9, the ports 26 and 27 communicate with bridging recesses 28ª in the cover, each recess connecting with the upper end of one of ports 26 or 27 and one side of the pressure chamber. Preferably a valve 28 having a handle 29 is provided in the passage 22 for controlling the flow of air through this passage to thereby start and stop and regulate the speed of the operation of the cleaner. Atmospheric pressure is alternately admitted to the faces of the vane and the faces of the vane alternately placed in communication with the suction passage 22 by suitable valves and valve actuating mechanism. To this end valve plugs 30 and 31 are located respectively in the valve chambers 24 and 25. Each of these valve plugs has an upper face 32 adapted to engage and cover the corresponding end of branch passageway 23 in the cover plate and a head 32ª which closely fits the valve chamber and is adapted to cover and uncover the open end of port 26 or 27 in the valve chamber. Each of the valve plugs 30 and 31 is preferably grooved or cut away at one side as at 33 from the bottom to a point adjacent the head and provided with annular grooves 34 so that air can be drawn up past the valve plugs and into the ports 26, 27 when the valve plugs are seated to close branch passages 23. When the valve plugs are in the position shown in Fig. 7 with the valve plug 30 closing its corresponding passage 23 in the cover and valve plug 31 in the lowered position, the left hand face of the vane is connected with the suction passage 22 through the port 26 leading to the valve chamber 25 and communication between the right hand passage 23 and the vane is closed while the right face of the vane is opened to atmospheric pressure through the groove 33 of the valve plug 30. This position of the valve plugs causes the vane to swing to the left in the vane chamber until the positions of the valve plugs are reversed to cause an opposite swinging movement of the vane.

For alternately reversing the position of the valves, a valve actuating rocker 35 is arranged in the outer chamber 11 preferably being pivoted on a pin 36 screwed into the casing 7. This rocker is provided with lateral arms 37 and 38 which are respectively seated in recesses 37ª and 38ª in the valve plugs 30 and 31 and with a pair of downwardly extending arms 39 and 40 having horizontally disposed ears 41 and 42 by which the rocker member 35 is alternately rocked in opposite directions to operate the valves. For alternately rocking the arm in opposite directions and in order that a quick or snap action may be imparted to the arms whereby the valves will be respectively snapped open and closed a spring operative snap device is provided. This device preferably include a U-shape upper arm 43, one leg of the U-shape arm being pivoted on a pin 44 secured to a cross member 45 screwed or otherwise secured to the casing as at 46. This upper arm 43 oscillates between a pair of stops 47 and 48 preferably formed on the casing and which limit its movements. The opposite and lower member 49 of the spring snap device is preferably of substantially the same construction as the upper member 43 and at its inner end the legs of the lower member 49 are likewise pivoted on the pins 36 and 44. The free ends of the arms 43 and 49 are connected to one another in suitable manner by means of a coiled spring 50 or other tensioning device connected to the respective snap arms by suitable means. As shown, one end of the spring may be connected to an eye 51 secured to the free end of the lower member 49 of the toggle, and the opposite end of the spring may be connected to a pin 52 secured in the upper end of the upper snap arm 43 and preferably extending from said snap arm to be engaged by an actuating member. The mechanism for initiating movement of the snap arms preferably includes a plate 53 mounted on the end of the rock shaft 5 and secured by means of a pin 54 and adapted to rock with said shaft and provided with shoulders 55 and 56 adapted to engage the projecting pin 52 on the upper snap arm to initiate movement of the spring arm device. 57 designate suitable washers or buffer on ears 41 and 42 of the rocker arms 39 and 40 against which the lower end of snap arm 49 contacts. The above arrangement of the mechanism for operating the valves provides a compact mechanism which is not readily gotten out of order and which at the same time will promptly open one valve and promptly close the other one so that leakage of the valves during their opening and closing movement is prevented and full pressure on the oscillating vane is imparted throughout the length of its stroke in either direction. The operation of the snap device may be observed in Fig. 7. With the arms 43 and 49 in the position illusetrated in this figure, the vane will be swinging to the left and the plate 53 moving in the direction of the dotted arrow. As soon as the shoulder 55 of this plate engages the pin 52, it will move the upper arm 43 of the snap device to the left until the upper end of the arm passes to the opposite side of the dead center and practically into engagement with the stop 49, whereupon the coil spring 50 will snap the arm 43 against the stop 48 and likewise snap the arm 49 to the left against the ear 42 of the rocker member 35, rocking this member so that its arm 38 engaging the stem of the valve plug 31 causes the upper or inner end of this valve to seat and close the passage 23 in the left hand of the cover plate, opening the left face of the vane to the atmosphere. At the same time the valve plug 30 will unseat the upper end 32ª of the valve plug thereby closing the right face of the vane to the atmosphere and opening it to the suction passage 22 through port 26 and passage 23 in the cover. This movement, however, of the snap device will not have taken place until the vane has swung the limit of its stroke. As soon as the positions of the valve plugs are reversed, atmospheric pressure will be admitted to the left face of the vane and a vacuum or partial vacuum produced on the right side so that the vane will swing in the reverse direction.

In the construction shown in Fig. 11, there are shown two wipers 2ª and 2ᵇ pivoted respectively to carrying arms 4ª and 4ᵇ which are connected to and ocillated by a mechanically propelled rock shaft 5ª which is mounted on the frame bar 6ª of the windshield 1ª. 7ª designates the motor for actuating rock shaft 5ª, which motor may be of the construction hereinbefore described or of other suitable construction. The wipers 2ª and 2ᵇ may be of any suitable construction, the wiper 2ᵇ preferably consisting of one or more strips of rubber adapted to bear against the face of the windshield glass and a metal channel piece in which the rubber strip or strips are confined, and the inner wiper 2ª preferably consists of one or more strips of felt or other suitable material adapted to press against and clean the inner side of the glass and confined in a suitable metal channel strip or the like.

The valve operating mechanism described herein gives a quick and positive movement to the valve plugs so that the full pressure is exerted on the vane at the beginning of its reverse swing as well as throughout its full swing in either direction.

By the mounting of the vane as heretofore described, the length of the stroke of the vane will be such that the operating arm 4 of the wiper may be moved to almost a horizontal position. At the same time, due to the flexible connection 3 between the wiper 2 and its arm, when the arm has reached the upward limit of its stroke the wiper can assume a horizonal position in direct engagement with the upper bar of the windshield, as shown in Fig. 2, so that the maximum area of the windshield will be wiped clean.

As above described, the heads of the valve plugs closely fit the valve chambers and the upper faces of the valve plugs seat on the cover over the ends of branch passages 23. Suction in passages 22 and 23 will tend to hold the valve plug faces firmly seated on the ends of branch passages 23 which together with the closely fitting head of the valve plug in the valve chamber effectively prevent leakage past the valve plug heads when the valves are closed.

I claim as my invention:

1. In a fluid pressure motor adapted for operating windshield cleaners and the like, the combination of a pressure chamber having inner and outer concentric, segmental-circular walls of different radii, a vane arranged to oscillate in said chamber about the axis of said walls and having its inner and outer ends conforming in shape to and slidably contacting with said walls, said vane including spaced substantially parallel plates and packing members having flexible edge portions extending inwardly beyond said plates and towards each other, the edges of one packing member engaging the edges of the opposite packing member in line with the space between said plates, and means for causing said vane to oscillate in said chamber.

2. In a fluid pressure motor, the combination of a pressure chamber having a pair of concentric, segmental-circular walls of different radii, a vane arranged to oscillate in said chamber about the axis of said walls and having its inner and outer ends conforming in shape to and slidably contacting with said walls, said vane including a pair of spaced substantially cup-shaped packing members having flexible side edge portions extending inwardly toward each other, the edges of one packing member being adapted to engage the edges of the opposite packing member in line with the space between said members, whereby inward deflection of the edges of one of said packing members is resisted by the edges of the other packing member, and means for causing said vane to oscillate in said chamber.

3. In a fluid pressure motor, the combination of a pressure chamber having inner and outer concentric parallel segmental-circular walls of different radii and transversely curved, a vane arranged to oscillate in said chamber about the axis of said walls and having its inner and outer ends fitting slidably against said walls, said vane including a pair of spaced, substantially parallel plate members and resilient packing portions extending from the edges of said plate members inwardly towards each other, the edges of one of said packing portions contacting with the edges of the other packing portion in line with the space between said plate members, and means for causing said vane to oscillate in said chamber.

4. In a fluid pressure motor having a pressure chamber, a vane adapted to oscillate from a fixed axis therein, a rock shaft, said vane including a pair of spaced parallel plates, a pair of packing members secured to said plates and having flexible side edge portions extending inwardly towards each other beyond said plates in the space between said plates, and means extending across a portion of the space between said plates and secured to said plates for connecting said vane to said rock shaft.

5. In a fluid pressure motor, the combination of a pressure chamber, a removable cover for said pressure chamber, a vane arranged to oscillate in said chamber, and means for simultaneously connecting one face of said vane with a source of fluid at one pressure and the other face of said vane with a source of fluid at a different pressure, said means including a pair of valve chambers having ports in communication with the faces of said vane, passages in said cover communicating with one of said sources of fluid pressure and with said valve chambers, a valve plug in each valve chamber, each of said valve plugs having a portion adapted to seat against said cover to close the passages in said cover to said valve chambers, and means for alternately actuating said valve plugs to open and close said passages.

6. In a fluid pressure motor, the combination of a pressure chamber, a removable cover for said pressure chamber, a vane arranged to oscillate in said chamber, and means for simultaneously connecting one face of said vane with a source of fluid at one pressure and the other face of said vane with a source of fluid at a different pressure, said means including a pair of valve chambers having ports in communication with the faces of said vane, passages in said cover communicating with one of said sources of fluid pressure and with said valve chambers, a valve plug in each valve chamber, each of said valve plugs having a head adapted to close the port leading from its valve chamber to the vane face and to seat on the cover to close the passage to said valve chamber from said source of fluid pressure.

7. In a fluid pressure motor, the combination of a pressure chamber, a removable cover for said pressure chamber, a vane arranged to oscillate in said chamber, and means for simultaneously connecting one face of said vane with a source of fluid at one pressure and the other face of said vane with a source of fluid at a different pressure, said means including a pair of valve chambers having ports in communication with said faces of said vane, passages in said cover communicating with one of said sources of fluid pressure and with said valve chambers, a valve plug in each valve chamber, each of said valve plugs having a head adapted to close the port leading from its valve chamber to the vane and to seat on the cover to close the passage to said valve chamber from said source of fluid pressure, and a recessed portion below said head for permitting the passage of air at atmospheric pressure through said valve chamber port when the passage from said source of fluid pressure is closed.

8. In a fluid pressure motor, the combination of a vane and a pressure chamber, and means for applying pressure alternately to the faces of said vane for oscillating said vane, said means including a pair of valve chambers and a valve plug in each chamber, ports for placing said valve chambers in communication with a source of suction, a port from one of said valve chambers to said pressure chamber at one face of said vane, a port from the other of said valve chambers to said pressure chamber at the other face of said vane, each of said valve plugs having a head closely fitting its respective valve chamber and a face adapted to cover and close one of said first named suction ports, whereby communication between each suction port and its respective value chamber is closed by the seating of said valve plug face on said port and the contacting of said valve plug head with the walls of said valve chamber.

9. In a fluid pressure motor having a pressure chamber and a vane adapted to oscillate from a fixed axis therein, a rock shaft, said vane including a par of spaced parallel plates, a pair of spaced packing members secured to said plates and having flexible side edge portions extending inwardly towards each other beyond said plates, the side edges of one of said packing members engaging the side edges of the other of said packing members substantially centrally of the space between said plates, and means extending across a portion of the space between said plates and secured to said plates for connecting said vane to the rock shaft.

10. In a fluid pressure motor having a pressure oscillable in an arc of a circle, a segmental-circular pressure chamber therefor, a rock shaft on which said vane is mounted, and a pair of valves and fluid pressure connections for causing a preponderance of fluid pressure in the piston chamber alternately on the faces of the vane for causing oscillations of the vane, the combination of a pivoted rocker for shifting said valves, said rocker having an actuating arm, a spring connected at one end to said rocker actuating arm and extending across the pivot of said rocker, the other end of said spring being adapted to be moved first to one side and then to the other side of the pivot of said rocker, and means fixed on a portion of said rock shaft for shifting said other end of the spring to one side or the other of the pivotal axis of said rocker.

11. In a fluid pressure motor having a pressure chamber and an oscillatory vane mounted on a rock shaft in said chamber for swinging in an arc of a circle therein, valves for causing a preponderance of fluid pressure in the pressure chamber alternately on the faces of the vane for causing the vane to oscillate, a pivoted rocker for alternately operating said valves, a spring actuated snap action device for alternately rocking said rocker in opposite directions, and a member fixed directly on the vane shaft of said vane for engaging and imparting initial movement in opposite directions to said snap device as said vane is oscillated.

JOHN R. OISHEI.

pressure, said means including a pair of valve chambers having ports in communication with the faces of said vane, passages in said cover communicating with one of said sources of fluid pressure and with said valve chambers, a valve plug in each valve chamber, each of said valve plugs having a head adapted to close the port leading from its valve chamber to the vane face and to seat on the cover to close the passage to said valve chamber from said source of fluid pressure.

7. In a fluid pressure motor, the combination of a pressure chamber, a removable cover for said pressure chamber, a vane arranged to oscillate in said chamber, and means for simultaneously connecting one face of said vane with a source of fluid at one pressure and the other face of said vane with a source of fluid at a different pressure, said means including a pair of valve chambers having ports in communication with said faces of said vane, passages in said cover communicating with one of said sources of fluid pressure and with said valve chambers, a valve plug in each valve chamber, each of said valve plugs having a head adapted to close the port leading from its valve chamber to the vane and to seat on the cover to close the passage to said valve chamber from said source of fluid pressure, and a recessed portion below said head for permitting the passage of air at atmospheric pressure through said valve chamber port when the passage from said source of fluid pressure is closed.

8. In a fluid pressure motor, the combination of a vane and a pressure chamber, and means for applying pressure alternately to the faces of said vane for oscillating said vane, said means including a pair of valve chambers and a valve plug in each chamber, ports for placing said valve chambers in communication with a source of suction, a port from one of said valve chambers to said pressure chamber at one face of said vane, a port from the other of said valve chambers to said pressure chamber at the other face of said vane, each of said valve plugs having a head closely fitting its respective valve chamber and a face adapted to cover and close one of said first named suction ports, whereby communication between each suction port and its respective value chamber is closed by the seating of said valve plug face on said port and the contacting of said valve plug head with the walls of said valve chamber.

9. In a fluid pressure motor having a pressure chamber and a vane adapted to oscillate from a fixed axis therein, a rock shaft, said vane including a par of spaced parallel plates, a pair of spaced packing members secured to said plates and having flexible side edge portions extending inwardly towards each other beyond said plates, the side edges of one of said packing members engaging the side edges of the other of said packing members substantially centrally of the space between said plates, and means extending across a portion of the space between said plates and secured to said plates for connecting said vane to the rock shaft.

10. In a fluid pressure motor having a pressure oscillable in an arc of a circle, a segmental-circular pressure chamber therefor, a rock shaft on which said vane is mounted, and a pair of valves and fluid pressure connections for causing a preponderance of fluid pressure in the piston chamber alternately on the faces of the vane for causing oscillations of the vane, the combination of a pivoted rocker for shifting said valves, said rocker having an actuating arm, a spring connected at one end to said rocker actuating arm and extending across the pivot of said rocker, the other end of said spring being adapted to be moved first to one side and then to the other side of the pivot of said rocker, and means fixed on a portion of said rock shaft for shifting said other end of the spring to one side or the other of the pivotal axis of said rocker.

11. In a fluid pressure motor having a pressure chamber and an oscillatory vane mounted on a rock shaft in said chamber for swinging in an arc of a circle therein, valves for causing a preponderance of fluid pressure in the pressure chamber alternately on the faces of the vane for causing the vane to oscillate, a pivoted rocker for alternately operating said valves, a spring actuated snap action device for alternately rocking said rocker in opposite directions, and a member fixed directly on the vane shaft of said vane for engaging and imparting initial movement in opposite directions to said snap device as said vane is oscillated.

JOHN R. OISHEI.

Certificate of Correction.

It is hereby certified that in Letters Patent No. 1,567,328, granted December 29, 1925, upon the application of John R. Oishei, of Buffalo, New York, for an improvement in "Motors for Windshield Cleaners," errors appear in the printed specification requiring correction as follows: Page 3, line 33, for the word "include" read *includes;* page 5, line 55, claim 8, for the word "value" read *valve;* same page, line 62, claim 9, for the word "par" read *pair*, and line 76, claim 10, for the word "pressure" read *vane;* and that the said Letters Patent should be read with these corrections therein that the same may conform to the record of the case in the Patent Office.

Signed and sealed this 26th day of January, A. D. 1926.

[SEAL.]

WM. A. KINNAN,
*Acting Commissioner of Patents.*

Certificate of Correction.

It is hereby certified that in Letters Patent No. 1,567,328, granted December 29, 1925, upon the application of John R. Oishei, of Buffalo, New York, for an improvement in "Motors for Windshield Cleaners," errors appear in the printed specification requiring correction as follows: Page 3, line 33, for the word " include " read *includes;* page 5, line 55, claim 8, for the word " value " read *valve;* same page, line 62, claim 9, for the word " par " read *pair*, and line 76, claim 10, for the word " pressure " read *vane;* and that the said Letters Patent should be read with these corrections therein that the same may conform to the record of the case in the Patent Office.

Signed and sealed this 26th day of January, A. D. 1926.

[SEAL.]
WM. A. KINNAN,
*Acting Commissioner of Patents.*